(12) United States Patent
Ali et al.

(10) Patent No.: US 8,233,747 B2
(45) Date of Patent: Jul. 31, 2012

(54) METHOD AND APPARATUS FOR FORMING SUPER RESOLUTION IMAGES FROM RAW DATA REPRESENTATIVE OF COLOR FILTER ARRAY IMAGES

(75) Inventors: Gazi Ali, Santa Clara, CA (US); Ming-Chang Liu, San Jose, CA (US)

(73) Assignees: Sony Corporation, Minato-Ku, Tokyo (JP); Sony Electronics, Inc., Park Ridge, NJ (US)

( * ) Notice: Subject to any disclaimer, the term of this patent is extended or adjusted under 35 U.S.C. 154(b) by 789 days.

(21) Appl. No.: 12/418,216

(22) Filed: Apr. 3, 2009

(65) Prior Publication Data

US 2010/0254630 A1 Oct. 7, 2010

(51) Int. Cl.
*G06K 9/32* (2006.01)
(52) U.S. Cl. ........ 382/299; 382/128; 382/162; 382/168; 382/129; 382/130; 382/131; 382/132; 382/163; 382/164; 382/165; 382/167
(58) Field of Classification Search .................. 382/299, 382/128, 162, 168, 129, 130, 131, 132, 163, 382/164, 165, 167
See application file for complete search history.

(56) References Cited

U.S. PATENT DOCUMENTS

| 416,478 A | 8/1979 | Jain |
| 615,451 A | 11/2000 | Florent et al. |
| 6,836,289 B2 | 12/2004 | Koshiba et al. |
| 6,933,970 B2 | 8/2005 | Koshiba et al. |
| 7,822,251 B2 * | 10/2010 | Ding ............................. 382/130 |
| 7,848,554 B2 * | 12/2010 | Zhao et al. .................... 382/128 |
| 2006/0279585 A1 | 12/2006 | Milanfar et al. |

FOREIGN PATENT DOCUMENTS

| EP | 0644686 A2 | 3/1995 |
| EP | 0670528 A2 | 9/1995 |

(Continued)

OTHER PUBLICATIONS

Gotoh, Tomomasa et al., "Direct Super-Resolution and Registration Using RAW CFA Images," Proceedings of the 2004 IEEE Computer Society Conference on Computer Vision and Pattern Recognition (CVPR'04), vol. 2, Issue 27, Jun. 27-Jul. 2, 2004, pp. II-600-II-607.

(Continued)

*Primary Examiner* — Mike Rahmjoo
(74) *Attorney, Agent, or Firm* — Moser Taboada

(57) ABSTRACT

A method and apparatus for generating a super-resolution image are provided. The method may include obtaining a first set of RAW data representing a first image captured at a first resolution and obtaining, from the first set of RAW data, at least one first sample of data associated with the first image. The method may also include obtaining a second set of RAW data representing a second image captured at the first resolution, and performing image registration as a function of the first set of RAW data and the second set of RAW data so as to obtain at least one second sample of data associated with the second image. The first set of RAW data is used as a reference for the second set of RAW data. The method further includes combining the at least one first sample of data with at least one second sample of data to form a collection of samples, and interpolating the collection of samples to form the super-resolution image.

20 Claims, 4 Drawing Sheets

FOREIGN PATENT DOCUMENTS

| | | |
|---|---|---|
| EP | 1111904 A2 | 6/2001 |
| JP | 2003018398 A2 | 1/2003 |
| JP | 20050270761 A2 | 1/2005 |

OTHER PUBLICATIONS

Park, Sung Cheol et al., "Super-Resolution Image Reconstruction: A Technical Overview," IEEE Signal Processing Magazine, May 2003, pp. 21-36.

Gunturk, Bahadir K. et al., "Color Plane Interpolation Using Alternating Projections," IEEE Transactions on Image Processing, vol. 11, No. 9, Sep. 2002, pp. 997-1013.

Hirakawa, Keigo et al., "Adaptive Homogeneity-Directed Demosaicing Algorithm," IEEE Transactions on Image Processing, vol. 14, No. 3. Mar. 2005, pp. 360-369.

\* cited by examiner

METHOD AND APPARATUS FOR FORMING SUPER RESOLUTION IMAGES FROM RAW DATA REPRESENTATIVE OF COLOR FILTER ARRAY IMAGES

BACKGROUND

1. Field

Embodiments of the present invention generally relate to super-resolution imaging, and more particularly, to a method and apparatus for forming super-resolution images from RAW data representative of color-filter-array ("CFA") images.

2. Related Art

Today's image capturing devices, such as digital cameras, camcorders, mobile phones, smart phones, Personal Digital Assistants ("PDA") and any other like-type device, each include an imaging module that can be used to capture a number or sequence of images (each a "captured image"). To facilitate this, the imaging module includes a sensor, which in turn, includes an array of elements or pixels (collectively "pixels"); and generally a color filter array ("CFA") overlaying the array of pixels.

Typically, the CFA includes pluralities of red, green and blue ("RGB") optical filters; one for each pixel in the array of pixels. The CFA is generally arranged in a mosaic pattern ("CFA mosaic pattern") in which each of the RGB optical filters is not the same color as the RGB optical filters that are vertically or horizontally adjacent. The CFA-mosaic pattern may be defined, for example, so that all odd (i.e., first, third, fifth, etc.) rows of the pixels in the array are overlaid by an alternating pattern of green and red optical filters ("alternating-GR filters"), and all even (i.e., second, fourth, sixth, etc.) row of the pixels in the array are overlaid by an alternating pattern of blue and green optical filters ("alternating-BG filters").

The array of pixels are adapted to (i) sense, through the CFA, energy corresponding to luminescence associated with a scene (i.e., the captured image), (ii) convert such energy into respective electrical charges having electrical potentials corresponding to the luminescence, and (iii) store such charges ("stored charges"). Through scaling, the sensor makes the stored charges represent respective bytes of digital data; which have respective values proportional to the luminescence sensed by such pixels. The bytes of digital data that correspond to the entire captured image are commonly referred to as RAW and/or CFA (collectively "RAW") data.

The sensor typically outputs the RAW data responsive to a control signal, such as a signal to capture another image. This RAW data, as such, represents the CFA mosaic pattern. As a result, the RAW data does not represent a full color image. This is because the RAW data does not include data for all RGB planes at each of the pixels. That is, the RAW data is missing data for (i) red and blue channels at the pixels overlaid with green optical filters; (ii) red and green channels as at the pixels overlaid with blue optical filters; and (iii) and green and blue channels at pixels overlaid with red optical filters.

Legacy image-processing devices (which may be part of or completely separate from the aforementioned image capturing devices) use demosaicing to estimate missing color channels based on the RAW data. To carry out demosaicing, a legacy image-processing device typically applies, for each of the color planes, a bicubic interpolation to the RAW data. This causes the legacy image-processing device to interpolate each of the pixels using color channel information in the RAW data for pixels neighboring such pixel.

However, an image rendered from demosaicing ("demosaiced image") usually has colors not originally present in scene captured by the sensor ("false colors"). To reduce false colors, the legacy image-processing device may filter the already demosaiced image using one or more low-pass filters. Unfortunately, such filtering typically causes the demosaiced image to suffer from a blurring effect and other artifacts.

In addition, the interpolation will not produce the demosaiced image or will produce the demosaiced image with poor quality when the captured image is under sampled. Further, the interpolation does not restore any high frequency components and generally cannot account for different noise levels (e.g., different ISO levels). Moreover, the interpolation typically causes the demosaiced image to have an amount of pixels or resolution ("demosaiced-image resolution") lower than the captured image. At best, the demosaiced-image resolution is the same as the captured image; the difference between being that each of pixels of the demosaiced image may have contributions from each of the RGB planes.

Often, requirements for displaying, printing and/or further processing, necessitate an images having resolutions higher than that provided by the demosaiced image. To overcome this, the legacy image-processing devices have employed an imaging processing technique commonly referred to as "Super Resolution."

Super Resolution differs from interpolation in that it can restore to the captured image the high frequency components that correspond to finer details present in the scene, and produce an image having a resolution greater than that of the captured image ("super-resolution image"). To do this, a legacy image-processing device obtains several demosaiced images or otherwise interpolated images of the same scene; each of which is shifted, rotated or otherwise offset from the other. Thereafter, the legacy image-processing device samples such demosaiced or otherwise interpolated images to form one or more "images having resolutions lower than the demosaiced or otherwise interpolated images ("down-sampled images"). From the down-sampled images, the legacy image-processing device may form the super-resolution image. However, such super-resolution image usually has artifacts and blurring effects the same as or similar to those present in any of the demosaiced or otherwise interpolated images.

SUMMARY

A method and apparatus for generating a super-resolution image are provided. The method may include obtaining a first set of RAW data representing a first image captured at a first resolution and obtaining, from the first set of RAW data, at least one first sample of data associated with the first image. The method may also include obtaining a second set of RAW data representing a second image captured at the first resolution, and performing image registration as a function of the first set of RAW data and the second set of RAW data so as to obtain at least one second sample of data associated with the second image. The first set of RAW data is used as a reference for the second set of RAW data. The method further includes combining the at least one first sample of data with at least one second sample of data to form a collection of samples, and interpolating the collection of samples and the misalignment of the sample images to form the super-resolution image.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth in order to provide a thorough understanding of examples described herein. However, it will be understood that these examples may be practiced without the specific details. In other instances, well-known methods, procedures, components and circuits have not been described in detail, so as not to obscure the following description. Further, the examples disclosed are for exemplary purposes only and other examples may be employed in lieu of or in combination with of the examples disclosed.

Example Architecture

Figure 1:
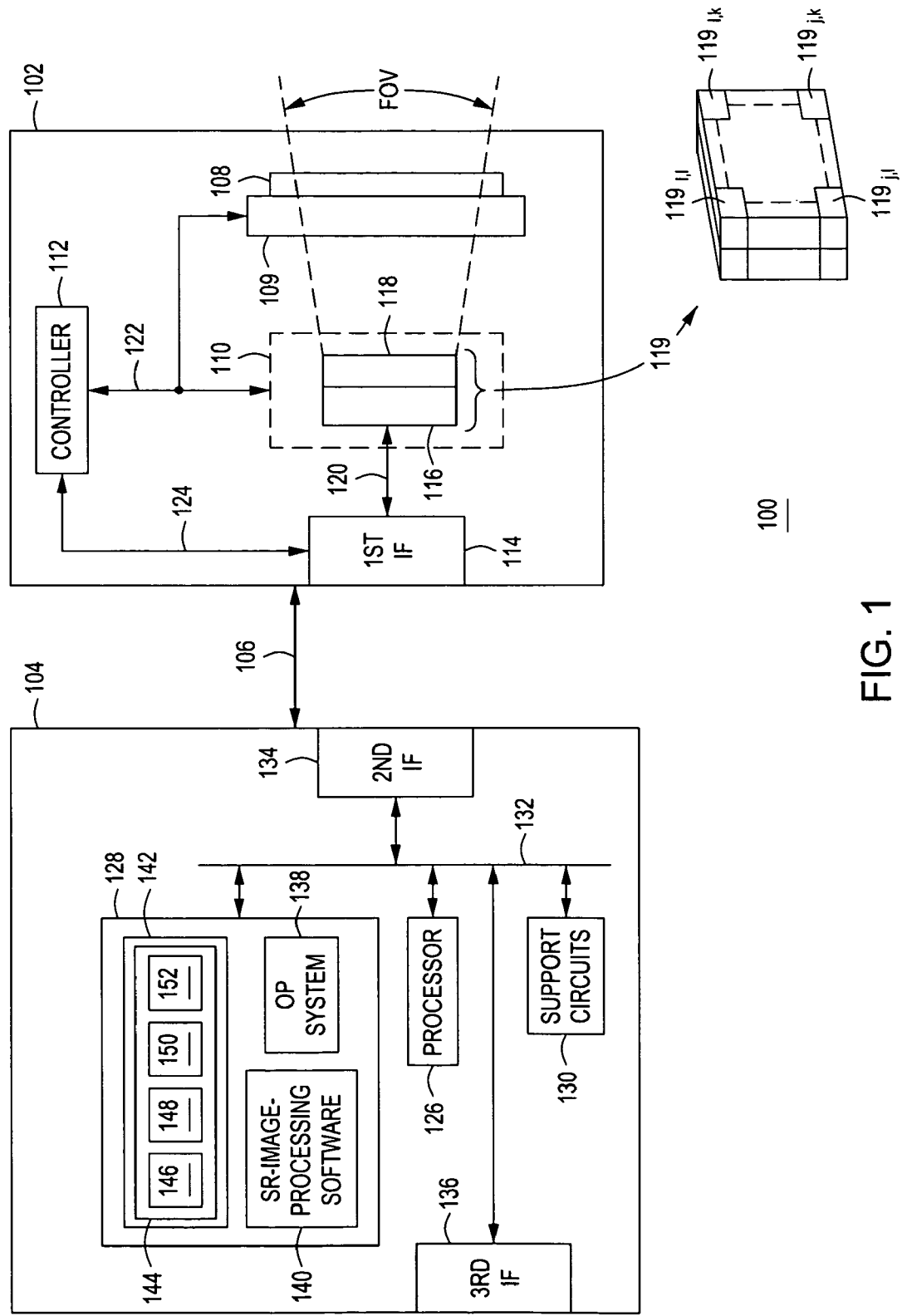
FIG. 1 is a block diagram illustrating an example system for forming a super resolution image from a plurality of color-filter-array ("CFA") images.

FIG. 1 is a block diagram illustrating an example system 100 for forming a super resolution image from a plurality of color-filter-array ("CFA") images. The system 100 may be any computing device, system and the like, and may be formed in a single unitary device and concentrated on a single server, client, peer or other type node. Alternatively, the system 100 may be formed from one or more separate devices, and as such, may be distributed among a number of server, client, peer or other type nodes. In addition, the system 100 may be scalable (i.e., may employ scale-up and/or scale-out approaches).

The system 100 may include a large number of elements; many of which are not shown for simplicity of exposition. As shown in FIG. 1, the system 100 includes an imaging device 102 and a processing platform 104, which may be communicatively coupled via link 106.

In accordance with above, the imaging device 102 may be a stand-alone device, such as a digital (still and/or video) camera. Alternatively, imaging device 102 may be included within or communicatively coupled as an accessory to any of a digital (still and/or video) camera, personal computer; portable computer, handheld computer; mobile phone, digital assistant, personal digital assistant, cellular phone, smart phone, pager, digital tablet, laptop computer, Internet appliance and the like.

The imaging device 102 is operable to capture within its field of view ("FOV") a plurality of images ("imaging-device images") of a scene at a given resolution ("imaging-device resolution"), and provide such imaging-device images to the processing platform 102 via the link 106. The imaging-device images may include first and second imaging-device images. The first imaging-device image and the second imaging-device image differ from one another in that the second imaging-device image is shifted, rotated or otherwise offset from the first imaging-device image.

To facilitate capturing the imaging-device images, the imaging device 102 may include a lens 108, a shutter 109, an imaging module 110, a controller 112 and a first input/output ("I/O") interface 114. The lens 108 may include any type of optics capable of focusing the scene for capture by the imaging module 110.

The imaging module 110 may include a charge-couple device ("CCD") 116 that, in turn, includes an array of pixels, and a color filter array ("CFA") 118 overlaying such array of pixels (collectively "CFA-pixel array" 119). The CFA-pixel array 119, as shown in exploded view, includes pixels $119_{1,1} \ldots 119_{j,k}$ that are arranged in j rows and k columns. The pixels $119_{1,1} \ldots 119_{j,k}$ may, for example, range from a hundred to twenty million. The pixels $119_{1,1} \ldots 119_{j,k}$, however, may be less than a hundred or greater than twenty million.

The number of the pixels $119_{1,1} \ldots 119_{j,k}$ defines the imaging-device resolution. In practice, the imaging-device resolution is typically less than the number of pixels $119_{1,1} \ldots 119_{j,k}$. This may be attributed to (i) the CFA-pixel array having one or more of the pixels $119_{1,1} \ldots 119_{j,k}$ that are inoperative, malfunctioning or otherwise not in use, and/or (ii) the CFA 118 causing one or more of the pixels to be inoperative, malfunction or otherwise not be use.

The CFA 118 may include pluralities of three different colored optical filters, namely, first, second and third colored filters; one for each of the pixels $119_{1,1} \ldots 119_{j,k}$. The CFA 118 may be, for example, a Bayer filter, which has a given mosaic pattern. This mosaic pattern defines that (i) the first-colored filters overlay the pixels $119_{1,1} \ldots 119_{j,k}$ disposed at intersections of all odd numbered (i.e., first, third, fifth, etc.) rows and columns and at intersections of even numbered (i.e., second, fourth, sixth, etc.) rows and columns (i.e., j and k are both odd or even), (ii) the second-colored filters overlay the pixels $119_{1,1} \ldots 119_{j,k}$ disposed at intersections of all odd numbered rows and all even numbered columns (i.e., j is odd and k is even), and (iii) the third-colored filters overlay the pixels $119_{1,1} \ldots 119_{j,k}$ disposed at intersections of all even numbered rows and all odd numbered columns (i.e., j is even and k is odd). The mosaic pattern may take other forms as well. In addition, the CFA 118 may include more, less or different colored optical filters, such as a CYGM filter, which includes cyan, yellow, green and magenta optical filters, and/or an RGBE filter, which includes red, green, blue and emerald optical filters.

The CFA-pixel array may be adapted to (i) sense, through the CFA 118, energy corresponding to luminescence associated with the scene in each of the imaging-device images, (ii) convert such energy into respective electrical charges having electrical potentials corresponding to the luminescence, and (iii) store the charges ("stored charges"). The CCD 116 or other component of the imaging module 110 (not shown) may scale the stored charges.

The CCD 116 or other component of the imaging module 110 (not shown) may form, as a function of the stored charges for each of the imaging-device images (i.e., respective CFA images), one or more sets of RAW data ("RAW datasets"). For example, the CCD 116 or other component of the imaging module 110 (not shown) may form a first-image-RAW dataset and a second-image-RAW dataset for the first and second CFA images, respectively. The first-image-RAW dataset represents, numerically, the first CFA image at the imaging-device resolution; and the second-image-RAW dataset represents, numerically, the second CFA image at the imaging-device resolution.

The CCD 116 or other component of the imaging module 110 (not shown) may also output the RAW datasets for transfer to the first I/O interface 114. To facilitate the transfer of the first-image-RAW and/or second-image-RAW datasets to the first I/O interface 114, the imaging device 102 may include a ("first internal") link 120 communicatively coupling the imaging module 110 and the first I/O interface 114. The first internal link 120 may include one or more linkable segments. These linkable segments may be disposed in one or more wired and/or wireless communication networks and/or one or more electrical busses.

The imaging device 102 may also include two other links, namely, second and third internal links 122, 124. The second and third internal links 122, 124 communicatively couple the controller 112 to (i) the imaging module 110 and shutter 109, and (ii) the first I/O interface 114, respectively. Like the first internal link 120, the second and third internal links 122, 124 may include one or more linkable segments, which may be disposed in one or more wired and/or wireless communication networks and/or one or more electrical busses.

The controller 112 may include logic (not shown) for controlling operation of the imaging device 102. This logic may, for example, provide one or more signals ("capture signals") via a second internal link 122 to cause the shutter 109 to open and/or close, and to cause the CCD 116 to capture the imaging-device images. The logic may provide the capture signals at a first given frequency. The first given frequency may be periodic, cyclic and/or episodic.

The logic may also provide one or more signals ("sequencing-control signals") to the CCD 116 or other component of the imaging module 110, via the second internal link 122, to cause the CFA-pixel array output the RAW datasets at a second given frequency. The second given frequency may be periodic, cyclic and/or episodic, and may be the same or different from the first given frequency.

The logic may further provide one or more signals ("first-interface-control signals") to the first I/O interface 114, via the third internal link 124, to cause the first I/O interface 114 to output to the link 106 the RAW datasets present in the first I/O interface 114. The logic may provide the first-interface-control signals at a third given frequency. The third given frequency may be periodic, cyclic and/or episodic, and may be the same or different from any of the first and second given frequencies.

To facilitate communicatively coupling the imaging device 102 and the processing platform 104, the link 106 may include one or more linkable segments. These linkable segments may be disposed in one or more wired and/or wireless communication networks and/or one or more electrical busses.

The processing platform 104 may be or be included within, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the processing platform 104 includes a processor-based platform that operates on any suitable operating system, such as Microsoft® Windows®, Apple OSX, UNIX, Linux and/or Symbian; and that is capable of executing software.

The processing platform 104 may, however, include a large number of elements; many of which are not shown in FIG. 1 for simplicity of exposition. As shown in FIG. 1, the processing platform 104 may include one or more processing units (collectively "processor") 126, memory 128, support circuits 130, bus 132, and second and third I/O interfaces 134, 136.

The processor 126 may be one or more conventional processors, microprocessors, multi-core processors and/or microcontrollers. The bus 132 provides for transmissions of digital information among the processor 126, memory 128, support circuits 130, second and third I/O interfaces 134, 136 and other portions of the processing platform 104 (not shown). The support circuits 130 facilitate operation of the processor 126, and may include well-known circuitry or circuits, including, for example, one or more I/O interfaces; one or more network interface units ("NIUs"); cache; clock circuits; power supplies and the like.

The second I/O interface 134 provides an interface to control the transmissions of digital information between components of processing platform 104 (shown and not shown) and between the processing platform 104 and the imaging device 102. To facilitate this, the second I/O interface 134 may include one or more NIUs for facilitating an exchange of information via the link 106. Accordingly, these NIUs may be adapted for communicating in accordance with one or more protocols of wired, wireless, satellite, and/or optical communications, including, for example, Ethernet and SONET protocols.

Like the second I/O interface 134, the third I/O interface 136 provides an interface to control the transmissions of digital information between components of processing platform 104 (shown and not shown). The third I/O interface 136 also provides an interface to control transmission of digital information between the processing platform 104 and other devices (not shown). To facilitate this, the third I/O interface 136 may include one or more NIUs for facilitating an exchange of information with such other devices. The NIUs may be adapted for communicating in accordance with one or more protocols of wired, wireless, satellite, and/or optical communications, including, for example, Ethernet and SONET protocols.

In addition, the third I/O interface 136 provides an interface to control the transmissions of digital information between I/O devices (not shown) associated with or otherwise attached to the processing platform 104. These I/O devices (not shown) may be embodied as any of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad, (vii) and the like.

The memory 128 may be or employ any of random access memory, read-only memory, optical storage, magnetic storage, removable storage, erasable programmable read only memory and variations thereof, content addressable memory and variations thereof, flash memory, disk drive storage, removable storage and the like. The memory 128 may store and receive queries from the processor 126 to obtain various software packages to be executed by the processor 126. These software packages may include an operating system 138 and SR-image-processing software 140.

The memory 128 may store in one or more records 142 and/or receive requests from the processor 126 to obtain, from such records 142, one or more operands, operators, dimensional values, configurations, parameters and/or other data (collectively "information") that may be used by any of the operating system 138 and SR-image-processing software 140 to control the operation of and/or facilitate performing the functions of the processing platform 104.

The records 142 may include a data store 144. This data store 144 may include copies of the RAW datasets, such as a copy of the first-image-RAW dataset 146 along with a copy of the second-image-RAW dataset 148. The data store 114 may also include an interim dataset 150 and super-resolution dataset 152.

The first-image-RAW dataset 146 includes a number of data points ("first-image-RAW-data points"). These first-image-RAW-data points may be arranged in any number of ways. For simplicity of exposition, the first-image-RAW-data points map to the pixels $119_{1,1} \ldots 119_{j,k}$ of the first CFA image on a one-to-one basis. For example, the first-image-RAW dataset 146 may be represented as:

$$\text{first-image-RAW-dataset } 146 = \begin{Bmatrix} a_{1,1} & \ldots & a_{1,k} \\ \vdots & \ddots & \vdots \\ a_{j,1} & \ldots & a_{j,k} \end{Bmatrix} \quad (1)$$

where: first-image-RAW-data points $a_{1,1} \ldots a_{j,k}$ map to and numerically represent the pixels $119_{1,1} \ldots 119_{j,k}$, respectively, of the first CFA image.

Like the first-image-RAW dataset 146, the second-image-RAW dataset 148 includes a number of data points ("second-image-RAW-data points"). These second-image-RAW-data points may be arranged in any number of ways. For simplicity of exposition, the second-image-RAW-data points map to the pixels $119_{1,1} \ldots 119_{j,k}$ of the second CFA image on a one-to-one basis. For example, the second-image-RAW dataset 148 may be represented as:

$$\text{second-image-RAW-dataset } 148 = \begin{Bmatrix} b_{1,1} & \ldots & b_{1,k} \\ \vdots & \ddots & \vdots \\ b_{j,1} & \ldots & b_{j,k} \end{Bmatrix} \quad (2)$$

where: first-image-RAW-data points $b_{1,1} \ldots b_{j,k}$ map to and numerically represent the pixels $119_{1,1} \ldots 119_{j,k}$, respectively, of the second CFA image.

As described in more detail below, the SR-image-processing software 140 may use, form, populate, revise, etc. the datasets to facilitate forming the super resolution image. Like the first-image-RAW and second-image RAW datasets 146, 148, the interim dataset 150 and super-resolution dataset 152 include respective sets of data points.

The interim dataset 150, for example, may be represented as:

$$\text{interim dataset } 150 = \begin{Bmatrix} c_{1,1} & \ldots & c_{1,q} \\ \vdots & \ddots & \vdots \\ c_{p,1} & \ldots & c_{p,q} \end{Bmatrix} \quad (3)$$

where: interim-data points $c_{1,1} \ldots C_{p,q}$, map to and numerically represent a first expanded set of the pixels $119_{1,1} \ldots 119_{p,q}$, respectively, after the SR-image-processing software 140 performs one or more interim stages for forming a super resolution image as a function of the first-image-RAW and second-image RAW datasets 146, 148.

The super-resolution dataset 152, for example, may be represented as:

$$\text{super-resolution dataset } 152 = \begin{Bmatrix} d_{1,1} & \ldots & d_{1,q} \\ \vdots & \ddots & \vdots \\ d_{p,1} & \ldots & d_{p,q} \end{Bmatrix} \quad (4)$$

where: super-resolution-data points $d_{1,1} \ldots d_{p,q}$, map to and numerically represent a second expanded set of the pixels $119_{1,1} \ldots 119_{p,q}$, respectively, after the SR-image-processing software 140 completes forming a super resolution image as a function of the first-image-RAW and second-image RAW datasets 146, 148.

The operating system 140 may include code for operating the processing platform 104 and for providing a platform onto which the SR-image-processing software 140 may be executed. The SR-image-processing software 140 may be executed by the processor 126 to control the operation of and/or facilitate performing functions for forming the super-resolution image. To do this, the SR-image-processing software 140 may include one or more programmable and/or hard-coded functions, instructions, commands, directions, code and/or control data (collectively, "directives"). These directives, when executed by the processor 126, may interface with the memory 128 to obtain the datasets from the data store 144 for forming the super-resolution image.

As an alternative to the foregoing architecture, any of the directives of (i) the SR-image-processing software 140, and (ii) the SR-image-processing software 140 and/or other appropriate portion of the processing platform 104 may be implemented in any of software, firmware and/or hardware, and executed or otherwise addressed and instructed by the processor 126 to carry out such processing. To facilitate this, the directives and/or the SR-image-processing software 140 together with the processor 126 (and or other portions of the processing platform 104) may be, for example, implemented a special-purpose computer, a field programmable gate array ("FPGA"), an application specific integrated circuit ("ASIC"), a general purpose processor ("GPP"), a system on a chip ("SoC"), and the like.

Figure 2:
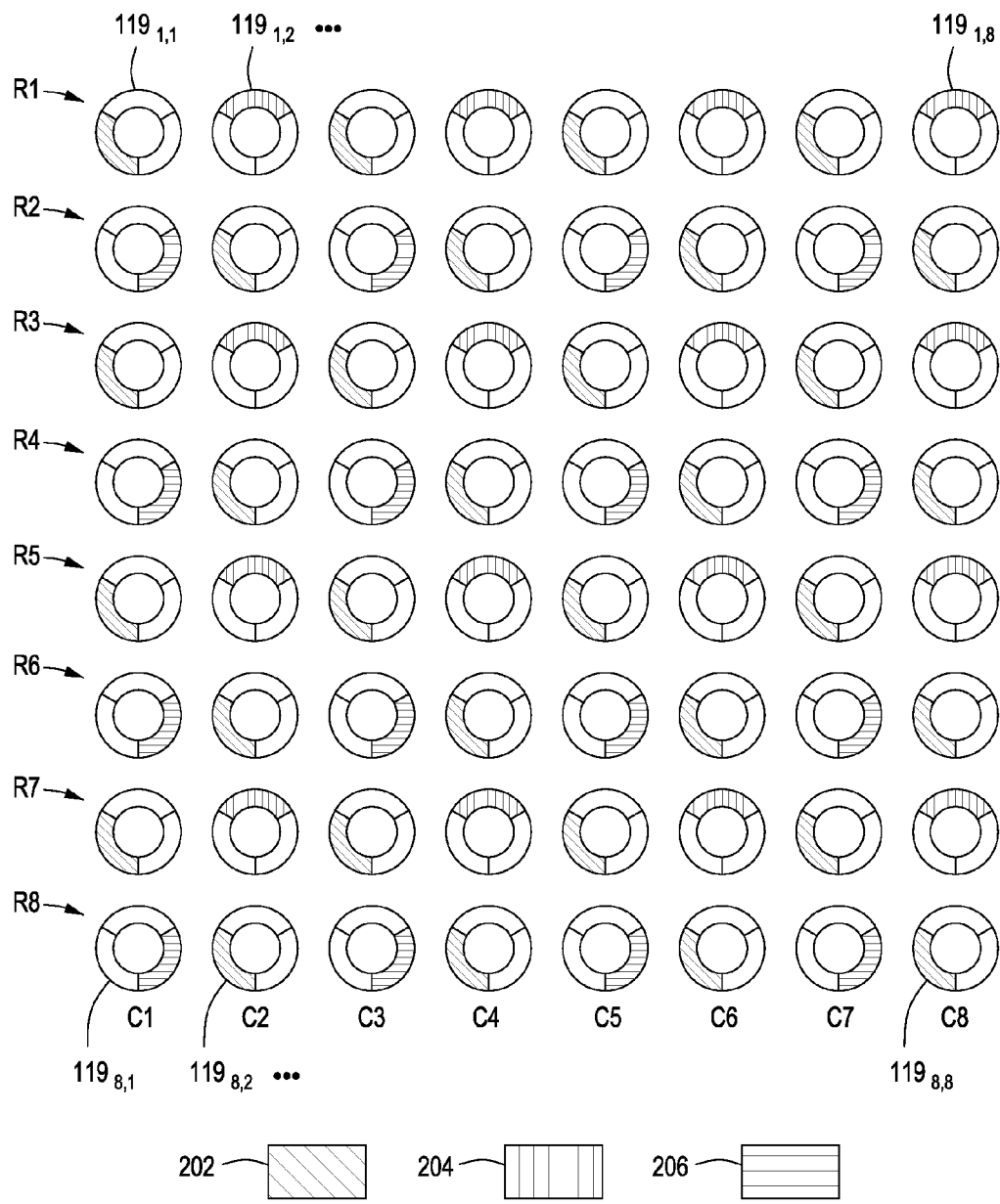
FIG. 2 is a block diagram illustrating an example pictorial rendering of a CFA image.

FIG. 2 is a block diagram illustrating an example pictorial rendering of a CFA image 200. The CFA image 200 may be representative of any of the aforementioned CFA images, including either of the first-CFA or second-CFA images.

The CFA image 200 includes the pixels $119_{1,1} \ldots 119_{8,8}$, which may be subdivided by color into three sets of pixels, namely, first-CFA-color-pixel, second-CFA-color-pixel and third-CFA-color-pixel sets 202, 204 and 206. The first-CFA-color-pixel set 202, which includes the pixels $119_{j,k}$, where j and k are both even or odd, may be colored according to a first (e.g., green) color channel of the CFA image 200. The second-CFA-color-pixel set 204, which includes the pixels $119_{j,k}$, where j is odd and k is even, may be colored according to a second (e.g., red) color channel of the CFA image 200. The third-CFA-color-pixel set 206, which includes the pixels $119_{j,k}$, where j is even k is odd, may be colored according to a third (e.g., blue) color channel of the CFA image 200.

In congruence with the CFA image 200, each of the first-image-RAW-data points $a_{1,1} \ldots a_{8,8}$ and second-image-RAW-data points $b_{1,1} \ldots a_{8,8}$ (generally, "RAW-data points $e_{1,1} \ldots e_{8,8}$") may map to and numerically represent the pixels $119_{1,1} \ldots 119_{8,8}$, respectively. Like the CFA image 200, the RAW-data points $e_{1,1} \ldots e_{8,8}$ may be subdivided into the three sets, namely, first-CFA-color-data, second-CFA-color-data and third-CFA-color-data sets $A_1$, $A_2$ and $A_3$. The first-CFA-color-data set $A_1$ includes the RAW-data points $e_{j,k}$, where j and k are both even or odd. The second-CFA-color-data set $A_2$ includes the RAW-data points $e_{j,k}$, where j is odd and k is even. The third-CFA-color-data set $A_3$ includes the RAW-data points $e_{j,k}$, where j is even k is odd.

Although the CFA image 200, as shown, includes sixty-four pixels and sixty-four RAW-data points, respectfully, the CFA image 200 may include more or fewer pixels. Accordingly, the RAW-data points $e_{1,1} \ldots e_{8,8}$ may include a number of RAW-data points corresponding to the number of pixels of the CFA image 200. The CFA image 200 and the RAW-data points $e_{1,1} \ldots e_{8,8}$ may include, for example, from about a few hundred to more than twenty million pixels and RAW-data points, respectfully.

Example Operation

Figure 3:
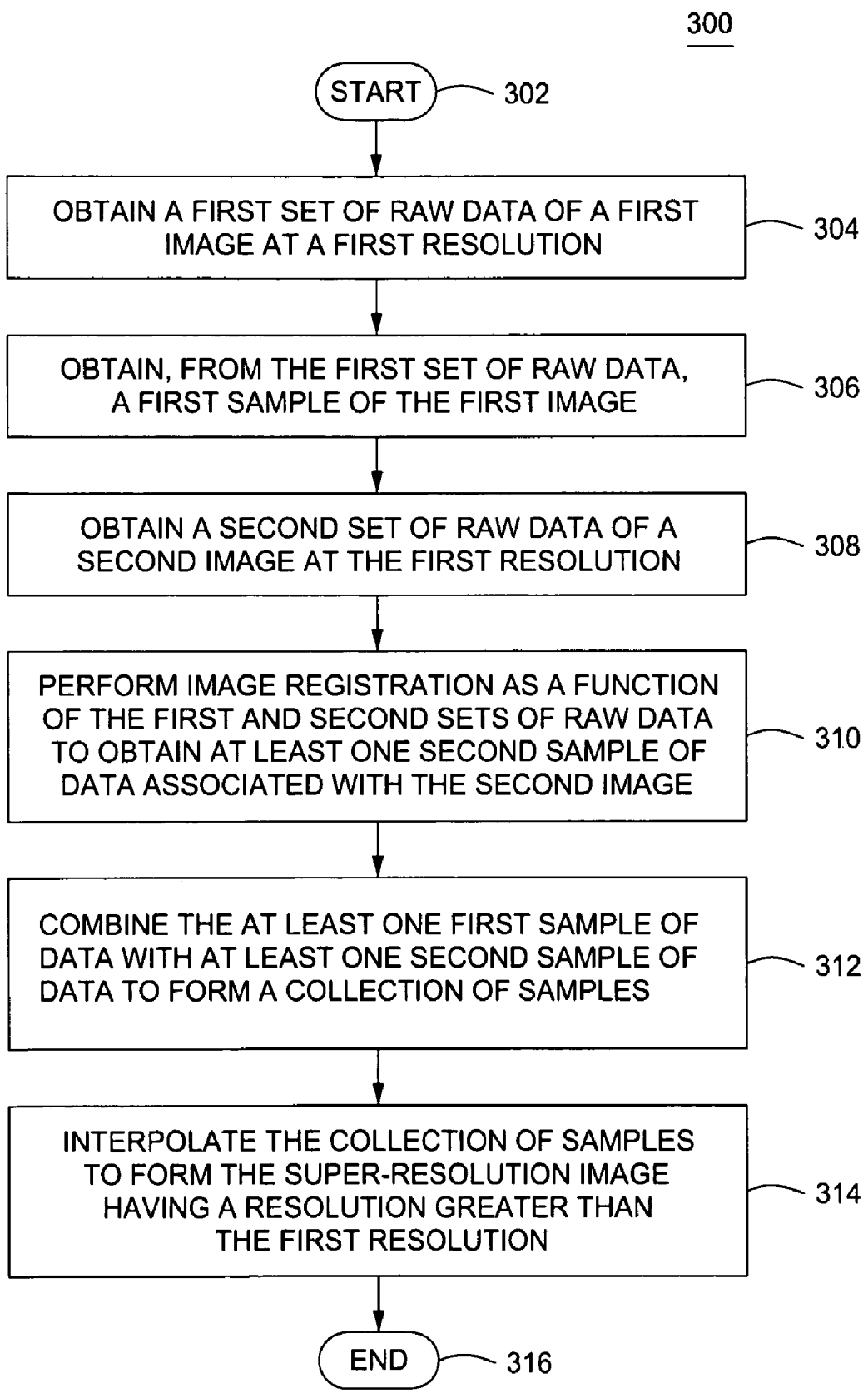
FIG. 3 is a flow diagram illustrating an example flow for forming a super resolution image from a plurality of CFA images.

FIG. 3 is a flow diagram illustrating an example flow 300 for forming a super resolution image from a plurality of CFA images. For convenience, the following describes the flow 300 with reference to the system 100 of FIG. 1 and the CFA image 200 of FIG. 2. The flow 300 may be carried out by other architectures as well.

The flow 300 starts at termination block 302, and sometime thereafter, transitions to process block 304. At process block 304, the SR-image-processing software 140 under execution of the processing platform 104 (hereinafter "executing SR-image-processing software 140") obtains from the imaging device 102 the first-image-RAW dataset 146, which as noted is representative of the first CFA image at a first resolution, namely, the imaging-device resolution. After process block 304, the flow 300 may transition to process block 306.

At process block 306, the executing SR-image-processing software 140 obtains from the first-image-RAW dataset 146 at least one first sample of data associated with the first CFA image ("first-CFA-image sample"). This first-CFA-image sample may be, for example, the first-image-RAW-data points $a_{1,1} \ldots a_{j,k}$ that represent a selected block of pixels of the first-CFA image ("selected first-CFA-image block"). The selected first-CFA-image block may include all or less than all of the pixels of the first CFA image. The executing SR-image-processing software 140 may obtain the first-CFA-image sample using any of a random or a methodical selection. After process block 306, the flow 300 may transition to process block 308.

At process block 308, the executing SR-image-processing software 140 obtains from the imaging device 102 the second-image-RAW dataset 148, which, as noted, is representative of the second-CFA image at the imaging-device resolution. After process block 308, the flow 300 may transition to process block 310.

At process block 310, the executing SR-image-processing software 140 performs an image registration, as a function of the first-image-RAW and second-image-RAW datasets 146, 148, so as to obtain at least one second sample of data associated with the second-CFA image ("second-CFA-image sample"). The executing SR-image-processing software 140 typically performs the image registration by using the selected first-CFA-image block as a reference and searching through the second-image-RAW dataset 148 to locate the second-image-RAW-data points $b_{1,1} \ldots b_{j,k}$ that correlate or otherwise correspond to the selected first-CFA-image block. These second-image-RAW-data points $b_{1,1} \ldots b_{j,k}$, in turn, become the second-CFA-image sample.

To facilitate locating such second-CFA-image sample, the executing SR-image-processing software 140 may perform the image registration (i) as described below with respect to FIG. 4 and/or (ii) in accordance with the teachings of in U.S. patent application Ser. No. 11/713,323 entitled "Motion Parameter Engine for True Motion" and/or U.S. patent application Ser. No. 11/713,254 entitled "High Accurate Subspace Extension of Phase Correlation for Global Motion Estimation". Each of the U.S. patent application Ser. Nos. 11/713,245 and 11/713,323 is incorporated herein by reference. The executing SR-image-processing software 140 may perform the image registration using other motion estimation and/or motion compensation techniques as well.

After process block 310, the flow 300 may transition to process block 312. At process block 312, the executing SR-image-processing software 140 combines the first-CFA-image sample with the second-CFA-image sample to form a collection of samples.

The executing SR-image-processing software 140 may, for example, form the collection of samples by combining the first-CFA-image and second-CFA-image samples in the interim dataset 150. The executing SR-image-processing software 140 may combine such samples by (i) populating the interim-data points $c_{1,1} \ldots c_{p,q}$, where p and q are both odd, on a one-to-one basis with the first-image-RAW-data points $a_{1,1} \ldots a_{j,k}$ that represent the selected first-CFA-image block; and (ii) populating the interim-data points $c_{1,1} \ldots c_{p,q}$, where p and q are both even, on a one-to-one basis with the second-image-RAW-data points $b_{1,1} \ldots b_{j,k}$ that represent the second-CFA-image block. The SR-image-processing software 140 may combine the first-CFA-image and second-CFA-image samples in other ways as well.

After process block 312, the flow 300 may transition to process block 314. At process block 314, the executing SR-image-processing software 140 interpolates the collection of non-uniform samples to form the super-resolution image, which has a second resolution that is greater than the image-device resolution. The executing SR-image-processing software 140 may, for example, interpolate the collection of samples by interpolating first, second and third color planes for the interim-data points $c_{1,1} \ldots c_{p,q}$ of the interim dataset 150 so as to form the super-resolution dataset 152.

The executing SR-image-processing software 140 may interpolate the first, second and third color planes by carrying out one or more demosaicing algorithms (e.g., any of an algorithm for multivariate interpolation, bilinear interpolation bicubic interpolation, spline interpolation, Lanczos resampling, non-uniform sample interpolation techniques, triangulation, mesh/grid interpolation, and/or edge directed interpolation) that are modified for the interim-data points $c_{1,1} \ldots c_{p,q}$ of the interim dataset 150. Such modification takes into account that the interim dataset 150 is not defined such that interim-data points $c_{1,1} \ldots c_{p,q}$ correspond to the CFA 118. That is, the interim dataset 150 is not defined such that (i) the interim-data points $c_{1,1} \ldots c_{p,q}$, where p and q are both even or odd, coincide with the first-CFA-color-data set $A_1$ of either or both of the first or second CFA images; (ii) the interim-data points $c_{1,1} \ldots c_{p,q}$, where p is odd and q is even, coincide with the second-CFA-color-data set $A_2$ of either or both of the first or second CFA images; and (iii) the interim-data points $c_{1,1} \ldots c_{p,q}$, where p is even and q is odd, coincide with the third-CFA-color-data set $A_3$ of either or both of the first or second CFA image.

Instead, the interim data set 150 may be defined such that (i) first, second and third CFA-color-data sets $B_1$, $B_2$ and $B_3$ that correspond to the first-image-RAW-data points $a_{1,1} \ldots a_{j,k}$ representing the selected first-CFA-image block coincide with respective sets of the interim-data points $c_{1,1} \ldots c_{p,q}$; and (ii) first, second and third CFA-color-data sets $C_1$, $C_2$ and $C_3$ that correspond to the second-image-RAW-data points $b_{1,1} \ldots b_{j,k}$ representing the second-CFA-image block coincide with respective sets of the interim-data points $c_{1,1} \ldots c_{p,q}$.

For instance, the first CFA-color-data set $B_1$ may coincide with the interim-data points $c_{1,1} \ldots c_{p,q}$, where (i) p and q are each selected from a set {1, 5, 9, 13, 17 ... } and (ii) p is selected from a set {3, 7, 11, 15, 19 ... } and q is selected from a set {2, 6, 10, 14, 18 ... }. The second CFA-color-data set $B_2$ may coincide with the interim-data points $c_{1,1} \ldots c_{p,q}$, where p is selected from the set {1, 5, 9, 13, 17 ... } and q is selected from a set {4, 8, 12, 16, 20 ... }. The third CFA-color-data set $B_3$ may coincide with the interim-data points $c_{1,1} \ldots c_{p,q}$, where p is selected from the set {3, 7, 11, 15, 19 ... } and q is selected from the set {1, 5, 9, 13, 17 ... }. Analogously, the first CFA-color-data set $C_1$ may coincide with the interim-data points $c_{1,1} \ldots c_{p,q}$, where (i) p is selected from the set {1, 5, 9, 13, 17 ... } and q is selected from the set {2, 6, 10, 14, 18 ... } and (ii) p is selected from the set {2, 6, 10, 14, 18 ... } and q is selected from the set {3, 7, 11, 15, 19 ... }. The second CFA-color-data set $C_2$ may coincide with the interim-data points $c_{1,1} \ldots c_{p,q}$, where p is selected from the set {1, 5, 9, 13, 17 ... } and q is selected from a set {3, 7, 11, 15, 19 ... }. The third CFA-color-data set $C_3$ may coincide with the interim-data points $c_{1,1} \ldots c_{p,q}$, where p is selected from the set {2, 6, 10, 14, 18 ... } and q is selected from the set {1, 5, 9, 13, 17 ... }. When defined in accordance with the foregoing, not all of the interim-data points $c_{1,1} \ldots c_{p,q}$ may be populated ("unpopulated interim-data points").

The executing SR-image-processing software 140 may interpolate such unpopulated interim-data points using the demosaicing algorithms as modified. Alternatively, the for the SR-image-processing software 140 may populate the unpopulated interim-data points using any of the first-image-RAW-data points $a_{1,1} \ldots a_{j,k}$ representing the selected first-CFA-image block and the second-image-RAW-data points $b_{1,1} \ldots b_{j,k}$ representing the second-CFA-image block.

Alternatively and/or additionally, the executing SR-image-processing software 140 may interpolate the first, second and third color planes by carrying out an orientation-based approach for forming a demosaiced image, such as described in co-pending U.S. patent application Ser. No. 12/418,217, filed Apr. 3, 2009, entitled "Orientation-Based Approach for Forming a Demosaiced Image, and for Color Correcting and Zooming the Demosaiced Image", which is incorporated herein by reference. The executing SR-image-processing software 140 may carry out such orientation-based approach for forming a demosaiced image as modified for the interim-data points $c_{1,1} \ldots c_{p,q}$ of the interim dataset 150.

By performing the foregoing, the super-resolution dataset 152 includes data for the first, second and third color planes, which when rendered, causes the super resolution image to have the first, second and third color plane at a resolution greater than the imaging-device resolution.

After process block 314, the flow 300 may transition to termination block 316. At termination block 316, the flow 300 may end. Alternatively, the flow 300 may be repeated periodically, in continuous fashion, or upon being triggered as a result of a condition, such as an impetus for forming one or more super resolution images.

Although the flow 300, as shown and described, is carried out using RAW datasets for only two of the CFA images, namely, the first and second CFA images, the flow 300 may be carried out using RAW datasets for more than two of the CFA images. Additionally, the process blocks 306-312 may be carried out over a number of iterations for a respective number of selected first-CFA-image blocks. This way, the collection of samples includes, for each of such selected first-CFA-image blocks, a respective number of second-CFA-image blocks.

In addition to interpolating the collection of samples to form the super-resolution image, the executing SR-image-processing software 140 may optionally perform a high frequency update to the super-resolution image. The executing SR-image-processing software 140 may perform such high frequency update in accordance with commonly-assigned co-pending U.S. patent application Ser. No. 12/418,217, filed Apr. 3, 2009. Other ways of performing the high frequency update are possible as well.

Example Image Registration and Sample Collection

Figure 4:
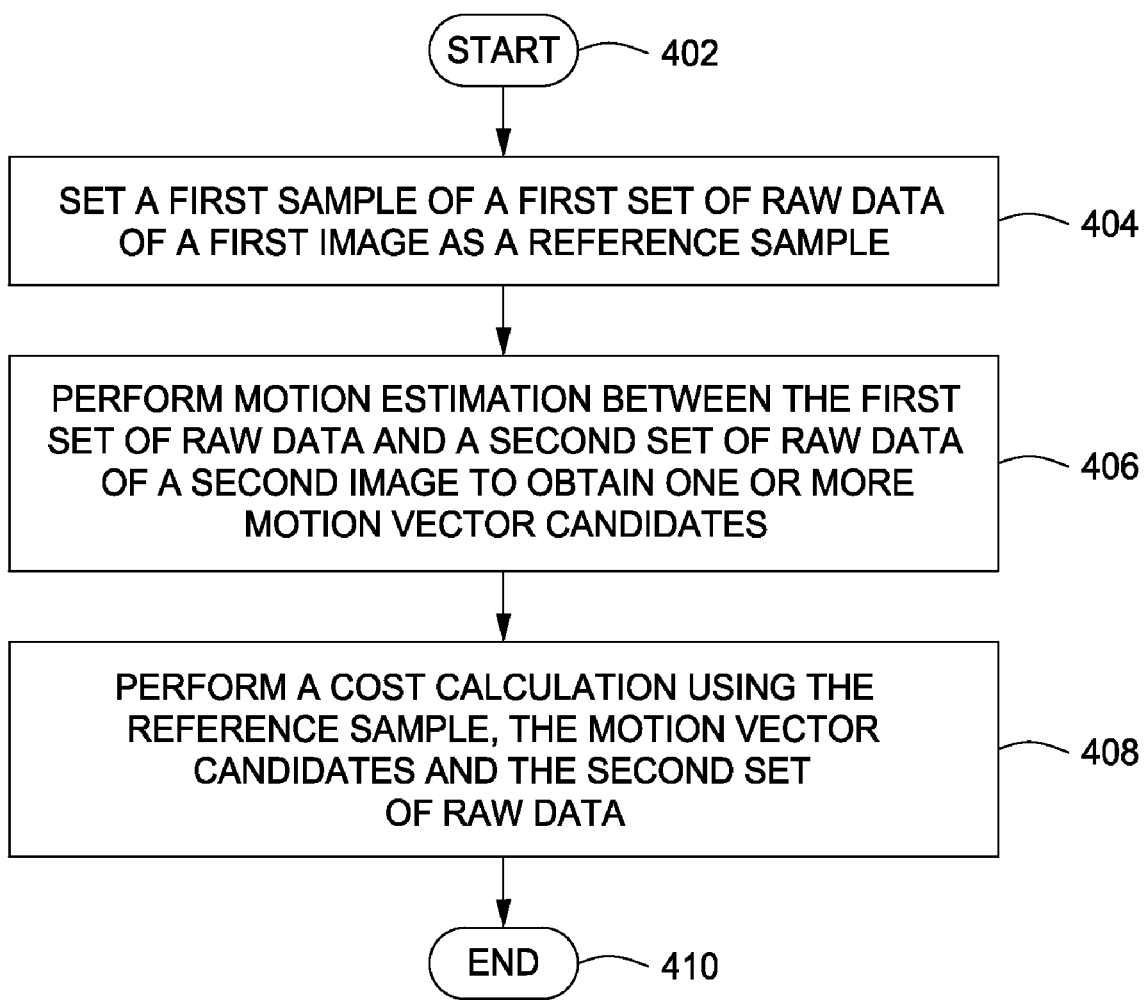
FIG. 4 is a flow diagram illustrating an example flow for performing image registration and sample collection as a function of a plurality of RAW datasets.

FIG. 4 is a flow diagram illustrating an example flow 400 for performing image registration and sample collection as a function of a plurality of RAW datasets. For convenience, the following describes the flow 400 with reference to the system 100 of FIG. 1, the CFA image 200 of FIG. 2 and the flow 300 of FIG. 3. The flow 400 may be carried out by other architectures as well.

The flow 400 starts at termination block 402, and sometime thereafter, transitions to process block 404. At process block 404, the executing SR-image-processing software 140 sets the first-CFA-image sample as a reference sample. After process block 404, the flow 400 may transition to process block 406.

At process block 406, the executing SR-image-processing software 140 performs motion estimation between the first-image-RAW and second-image-RAW datasets 146, 148. This may include the executing SR-image-processing software 140 performing motion estimation between the reference sample and samples $f_{1,1} \ldots f_{m,n}$ of the second-image-RAW dataset 148 to generate a number of motion vector candidates $g_{1,1} \ldots g_{s,t}$. The executing SR-image-processing software 140 may generate the motion vector candidates $g_{1,1} \ldots g_{s,t}$ in accordance with the with the teachings of in U.S. patent application Ser. No. 11/713,323 entitled "Motion Parameter Engine for True Motion" and/or U.S. patent application Ser. No. 11/713,254 entitled "High Accurate Subspace Extension of Phase Correlation for Global Motion Estimation".

In accordance with such teachings, the executing SR-image-processing software 140 may form an extended reference sample by applying a Fast-Fourier Transform to the reference sample. The executing SR-image-processing software 140 may form extended candidate samples $h_{1,1} \ldots h_{m,n}$ by applying a Fast-Fourier Transform to the samples $f_{1,1} \ldots f_{m,n}$. Thereafter, the executing SR-image-processing software 140 may perform phase correlations between the extended reference sample and each of the extended candidate samples $h_{1,1} \ldots h_{m,n}$ so as to obtain integer pair results $i_{1,1} \ldots i_{m,n}$. In addition, the executing SR-image-processing software 140 may also perform sub-pixel ("sub-pel") refinement to the integer pair results $i_{1,1} \ldots i_{m,n}$ so as to obtain respective peak phase correlations $j_{1,1} \ldots j_{m,n}$. After obtaining the peak phase correlations $j_{1,1} \ldots j_{m,n}$, the executing SR-image-processing software 140 may determine a maximum peak from the peak phase correlations $j_{1,1} \ldots j_{m,n}$. In addition, the executing SR-image-processing software 140 may form the motion vector candidates $g_{1,1} \ldots g_{s,t}$ by determining that the maximum peak satisfies (e.g., is greater than or equal to) a first threshold and that each of peak phase correlations $j_{1,1} \ldots j_{s,t}$ satisfies (e.g., is greater than or equal to) a second threshold that is formed as a function of the maximum peak. The second threshold may be, for example, the maximum peak multiplies by a specified or calculated multiplier.

After obtaining the motion vector candidates $g_{1,1} \ldots g_{s,t}$, the flow 400 may transition to process block 408. At process block 408, the executing SR-image-processing software 140 performs a cost calculation using the reference sample, the motion vector candidates $g_{1,1} \ldots g_{s,t}$ and samples $f_{1,1} \ldots f_{m,n}$ of the second-image-RAW dataset 148. This may include the executing SR-image-processing software 140 populating the interim dataset 150 with the reference sample, and then interpolating the interim dataset using any of the aforementioned demosaicing algorithms and/or Interpolation approaches discussed above with respect to FIG. 3.

After interpolating the interim dataset 150, the executing SR-image-processing software 140 may perform motion compensation as a function of the motion vector candidates $g_{1,1} \ldots g_{s,t}$ so as to motion compensate the interim dataset 150. The executing SR-image-processing software 140 may perform the motion compensation by determining for each of the motion vector candidates $g_{1,1} \ldots g_{s,t}$ as follows:

$$Y_{ref}(\vec{x}+\vec{v}) \qquad (5)$$

where: $Y_{ref}$ comprises representative data as a function of the reference sample, $\vec{x}$ is a coordinate vector associated with the reference sample, and $\vec{y}$ (this will be V) is one of the motion vector candidates $g_{1,1} \ldots g_{s,t}$.

After performing the motion compensation, the executing SR-image-processing software 140 may generate representative-data points $k_{1,1} \ldots k_{m,n}$ for the samples $f_{1,1} \ldots f_{m,n}$, respectively. The executing SR-image-processing software 140 may generate the weighted-data points $k_{1,1} \ldots k_{m,n}$ as follows:

$$Y=k_1 \text{*first-color pixel}+k_2 \text{*second-color pixel}+ \\ k_3 \text{*third-color pixel} \qquad (6)$$

where: Y comprises representative data for each of the samples $f_{1,1} \ldots f_{m,n}$.

After generating the representative-data points $k_{1,1} \ldots k_{m,n}$, the executing SR-image-processing software 140 may block process, for each of the representative-data points $k_{1,1} \ldots k_{m,n}$, $Y_{ref}$ and Y to obtain costs $l_{1,1} \ldots l_{m,n}$. The executing SR-image-processing software 140 may obtain the costs $l_{1,1} \ldots l_{m,n}$ as follows:

$$\text{Cost}_{m,n}=E(Y(\vec{x}),Y_{ref}(\vec{x}+\vec{v})) \qquad (7)$$

where: E is the cost function for the representative data of the reference sample and the corresponding sample $f_{m,n}$. Examples of E include, but are not limited to, SAD (sum of absolute difference), and MSE (mean square error)

After obtain the costs $l_{1,1} \ldots l_{m,n}$, the executing SR-image-processing software 140 may compare each of the costs $l_{1,1} \ldots l_{m,n}$ to a third threshold to determine whether the reference sample and the corresponding sample $f_{m,n}$ match. This third threshold may be formed as a function of the $Y_{ref}$ and a given weight. The weight may be a function of $Y_{ref}$ or a function of the contrast sensitivity function (CSF) of the human visual system (HVS).

If the reference sample and the corresponding sample $f_{m,n}$ match (i.e., satisfy the third threshold), then the executing SR-image-processing software 140 may update, revise, populate, etc. the interim data set with such corresponding sample $f_{m,n}$. The executing SR-image-processing software 140 may, for example, populate the interim-data point $c_{m,n}$ with the second-image-RAW-data point $b_{m,n}$ when the interim-data point $c_{m,n}$ does not include a contribution from the first-image-RAW-data point $a_{m,n}$.

Alternatively, the executing SR-image-processing software 140 may update the interim-data point $c_{m,n}$ with the second-image-RAW-data point $b_{m,n}$ when the interim-data point $c_{m,n}$ includes a contribution from the first-image-RAW-data point $a_{m,n}$. The executing SR-image-processing software 140 may update the interim-data point $c_{m,n}$ by applying (i) a constant first multiplier to the contribution from the first-image-RAW-data point $a_{m,n}$, and (ii) a constant second multiplier (e.g., 0.25) to a contribution from the second-image-RAW-data point $b_{m,n}$. The weighted sum of the overlapping samples will also be responsible for noise reduction.

After process block 408, the flow 400 may transition to termination block 410. At termination block 410, the flow 400 may end. Alternatively, the flow 400 may be repeated periodically, in continuous fashion, or upon being triggered as a result of a condition, such as an impetus for forming one or more super resolution images.

Although the flow 400, as shown and described, is carried out using RAW datasets for only two of the CFA images, namely, the first and second CFA images, the flow 400 may be carried out using RAW datasets for more than two of the CFA images. Additionally, the process blocks 404-408 may be carried out over a number of iterations for a respective number of selected first-CFA-image blocks. This way, the collection of samples includes, for each of such selected first-CFA-image blocks, a respective number of second-CFA-image blocks.

CONCLUSION

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, the exemplary embodiments described herein, may be embodied as methods, apparatus, electronic devices, and/or computer program products. Accordingly, such embodiments may be embodied in hardware and/or in software (including firmware, resident software, micro-code, etc.), which may be generally referred to herein as a "circuit" or "module".

Other exemplary embodiments may take forms of computer program products disposed on a computer-usable or computer-readable storage medium having computer-usable or computer-readable program code or instructions (collectively "code") embodied in the medium for use by or in connection with an instruction execution system. As used herein, the computer-usable or computer-readable medium may be any medium that can contain, store, communicate, propagate, or transport the code for use by or in connection with the instruction execution system, apparatus, or device. This code may also be stored in a computer-usable or computer-readable memory that may direct a computer or other programmable data processing apparatus to function in a particular manner, such that the code stored thereon produce an article of manufacture including code that implements the function specified in the foregoing flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory ("RAM"), a read-only memory ("ROM"), an erasable programmable read-only memory ("EPROM or Flash memory"), an optical fiber, and a compact disc read-only memory ("CD-ROM").

The code for carrying out operations of the present invention may be written in an object oriented programming language, such as Java.RTM, Smalltalk or C++, and the like.

However, the code for carrying out operations or functions may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits ("ASICs"), or programmed Digital Signal Processors or microcontrollers.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

It will be apparent to one of ordinary skill in the art that aspects of the invention, as described above, may be implemented in many different forms of software, firmware, and hardware in the implementations illustrated in the figures. Any actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

We claim:

1. A method for forming a super-resolution image, the method comprising:
using a processor for:
obtaining a first set of RAW data representing a first image captured at a first resolution;
obtaining, from the first set of RAW data, at least one first sample of data associated with the first image;
obtaining a second set of RAW data representing a second image captured at the first resolution;
performing image registration as a function of the first set of RAW data and the second set of RAW data so as to obtain at least one second sample of data associated with the second image, wherein the first set of RAW data is used as a reference for the second set of RAW data;
combining the at least one first sample of data with at least one second sample of data to form a collection of samples,
interpolating the collection of samples to form the super-resolution image, wherein the super-resolution image has a resolution greater than the first resolution.

2. The method of claim 1, wherein performing image registration comprises:
performing motion estimation between the first set of RAW data and the at least one second set of RAW data; and
performing a cost calculation as a function the first set of RAW data, the at least one second set of RAW data and at least one motion vector candidate associated with the at least one second set of RAW data.

3. The method of claim 2, wherein performing a cost calculation comprises: performing motion compensation between the first set of RAW data and the motion vector candidate associated with the at least one second set of RAW data.

4. The method of claim 3, wherein performing motion estimation comprises: performing motion estimation between the first set of RAW data and the at least one second set of RAW data so as to obtain the at least one motion vector candidate, and wherein performing a cost calculation comprises:
motion compensating the first set of RAW data as a function of the at least one motion vector candidate so as to form a motion-compensated first set of RAW data;
performing a representative data calculation between the motion-compensated first set of RAW data and the at least one second set of RAW data; and
performing block processing between the motion-compensated first set of RAW data and the at least one second set of RAW data to obtain a cost.

5. The method of claim 4, wherein combining the at least one first sample of data with at least one second sample of data to form a collection of samples comprises: combining the at least one first sample of data with the at least one second sample of data when the cost satisfies a given threshold.

6. The method of claim 4, wherein performing block processing comprises: calculating a cost difference between a first set of representative data of the motion-compensated first set of RAW data and a second set of reference data of the at least one second set of RAW data.

7. The method of claim 4, wherein performing motion estimation between the first set of RAW data and the at least one second set of RAW data comprises:
forming an extended reference sample from the first set of RAW data;
forming at least one extended candidate sample from the at least one second set of RAW data;
performing at least one phase correlation between the extended reference sample and the at least one extended candidate sample so as to obtain at least one integer pair result;
performing sub-pixel refinement to at least one the integer pair result to obtain at least one respective peak phase correlation;
determining a maximum peak from the at least one peak phase correlation;
making a first determination that indicates the maximum peak satisfies a first threshold;
making a second determining that indicate that the at least one peak phase correlation satisfies a second threshold that is formed as a function of the maximum peak; and
responsive to the first and second determinations, forming the at least one motion vector candidate.

8. The method of claim 5, wherein the given threshold is formed as a function of the cost and a given weight.

9. The method of claim 1, further comprising: populating entries of an array with the collection of samples, wherein interpolating the collection of samples comprises: interpolating the entries of the array.

10. The method of claim 1, wherein interpolating the collection of samples comprises: applying any of a demosaicing algorithm and interpolation approach to the collection of samples such that when rendered for display at least one pixel of the super-resolution image comprises contributions from each of first, second and third color channels.

11. An apparatus for forming a super-resolution image, the apparatus comprising:
memory to store executable instructions to:
obtain a first set of RAW data representing a first image captured at a first resolution;
obtain, from the first set of RAW data, at least one first sample of data associated with the first image;
obtain a second set of RAW data representing a second image captured at the first resolution;
perform image registration as a function of the first set of RAW data and the second set of RAW data so as to obtain at least one second sample of data associated with the second image, wherein the first set of RAW data is used as a reference for the second set of RAW data;
combine the at least one first sample of data with at least one second sample of data to form a collection of samples,
interpolate the collection of samples to form the super-resolution image, wherein the super-resolution image has a resolution greater than the first resolution; and
computer readable instructions to execute the executable instructions.

12. The apparatus of claim 11, wherein the executable instructions to perform image registration comprise: executable instructions to (i) perform motion estimation between the first set of RAW data and the at least one second set of RAW data, and (ii) perform a cost calculation as a function the first set of RAW data, the at least one second set of RAW data and at least one motion vector candidate associated with the at least one second set of RAW data.

13. The apparatus of claim 12, wherein the executable instructions to perform a cost calculation comprise: executable instructions to perform motion compensation between the first set of RAW data and the motion vector candidate associated with the at least one second set of RAW data.

14. The apparatus of claim 13, wherein the executable instructions to perform motion estimation comprise: executable instruction to perform motion estimation between the first set of RAW data and the at least one second set of RAW data so as to obtain the at least one motion vector candidate, and wherein the executable instructions to perform a cost calculation comprise: executable instructions to (i) motion compensate the first set of RAW data as a function of the at least one motion vector candidate so as to form a motion-compensated first set of RAW data, (ii) perform a luminance calculation between the motion-compensated first set of RAW data and the at least one second set of RAW data, and (iii) perform block processing between the motion-compensated first set of RAW data and the at least one second set of RAW data to obtain a cost.

15. The apparatus of claim 14, wherein the executable instructions to combine the at least one first sample of data with at least one second sample of data to form a collection of samples comprise: executable instructions to combine the at least one first sample of data with the at least one second sample of data when the cost satisfies a given threshold.

16. The apparatus of claim 14, wherein the executable instructions to perform block processing comprise: executable instructions to calculate a sum of absolute differences between luminescence of the motion-compensated first set of RAW data and luminescence of the at least one second set of RAW data.

17. The apparatus of claim 14, wherein the executable instructions to perform motion estimation between the first set of RAW data and the at least one second set of RAW data comprise executable instructions to:
form an extended reference sample from the first set of RAW data;
form at least one extended candidate sample from the at least one second set of RAW data;
perform at least one phase correlation between the extended reference sample and the at least one extended candidate sample so as to obtain at least one integer pair result;
perform sub-pixel refinement to at least one the integer pair result to obtain at least one respective peak phase correlation;
determine a maximum peak from the at least one peak phase correlation;
make a first determination that indicates the maximum peak satisfies a first threshold;
make a second determining that indicate that the at least one peak phase correlation satisfies a second threshold that is formed as a function of the maximum peak; and
form the at least one motion vector candidate responsive to the first and second determinations.

18. The apparatus of claim 15, wherein the given threshold is formed as a function of the cost and a given weight.

19. The apparatus of claim 11, wherein the memory further comprises: executable instruction to populate entries of an array with the collection of samples, wherein the executable instructions to interpolate the collection of samples comprise: executable instructions to interpolate the entries of the array.

20. The apparatus of claim 11, wherein the executable instructions to interpolate the collection of samples comprise: executable instructions to apply any of a demosaicing algorithm and interpolation approach to the collection of samples such that when rendered for display at least one pixel of the super-resolution image comprises contributions from each of first, second and third color channels.

* * * * *